United States Patent
Wallace et al.

(10) Patent No.: US 9,183,218 B1
(45) Date of Patent: Nov. 10, 2015

(54) METHOD AND SYSTEM TO IMPROVE DEDUPLICATION OF STRUCTURED DATASETS USING HYBRID CHUNKING AND BLOCK HEADER REMOVAL

(75) Inventors: Grant R. Wallace, Pennington, NJ (US); Abhinav Duggal, Delhi (IN)

(73) Assignee: EMC Corporation, Hopkinton, MA (US)

( * ) Notice: Subject to any disclaimer, the term of this patent is extended or adjusted under 35 U.S.C. 154(b) by 442 days.

(21) Appl. No.: 13/538,964

(22) Filed: Jun. 29, 2012

(51) Int. Cl.
*G06F 7/00* (2006.01)
*G06F 17/00* (2006.01)
*G06F 17/30* (2006.01)
*G06F 13/14* (2006.01)

(52) U.S. Cl.
CPC .................. *G06F 17/30156* (2013.01)

(58) Field of Classification Search
CPC .......... G06F 17/30159; G06F 11/1453; G06F 11/1469; G06F 11/1451; G06F 3/0641; G06F 17/30286; G06F 17/30563; G06F 17/30138; G06F 17/30592; G06F 7/00; G06F 17/30545; G06F 17/30569

USPC ......... 707/770, 640, 644, 645, 649, 825, 827, 707/634, 692, 755, 802, 822, 687, 705; 711/162; 709/203, 229

See application file for complete search history.

(56) References Cited

U.S. PATENT DOCUMENTS

| | | | |
|---|---|---|---|
| 7,519,635 B1 * | 4/2009 | Haustein et al. | 1/1 |
| 8,055,618 B2 * | 11/2011 | Anglin | 707/634 |
| 8,572,340 B2 * | 10/2013 | Vijayan et al. | 711/162 |
| 2009/0171888 A1 * | 7/2009 | Anglin | 707/2 |
| 2010/0082672 A1 * | 4/2010 | Kottomtharayil et al. | 707/770 |
| 2011/0231374 A1 * | 9/2011 | Jain et al. | 707/692 |

* cited by examiner

*Primary Examiner* — Usmaan Saeed
*Assistant Examiner* — Cecile Vo
(74) *Attorney, Agent, or Firm* — Blakely, Sokoloff, Taylor & Zafman LLP

(57) ABSTRACT

Techniques for deduplicating structured datasets using hybrid chunking and header removal. According to one embodiment, a request is received to deduplicate a file having a plurality of data blocks, each data block having a header and a data portion. The data blocks are anchored using first anchors to indicate block boundaries based on their headers. At least one second anchor is added within a data portion of at least one data block if the data portion of at least one data block satisfies a predetermined condition. The data blocks are then deduplicated based on the first and second anchors.

21 Claims, 9 Drawing Sheets

METHOD AND SYSTEM TO IMPROVE DEDUPLICATION OF STRUCTURED DATASETS USING HYBRID CHUNKING AND BLOCK HEADER REMOVAL

FIELD OF THE INVENTION

The embodiments of the invention are related to a deduplicated storage system. Specifically, the embodiments of the invention relate to a method and system for improving deduplication of a storage system using hybrid chunking and block header removal.

BACKGROUND

In computing, a data storage system is a key component to store data for computation and transferring. Data files generally contain redundant data. For example, an email file may contain email threads that earlier emails are copied multiple times in the later replies. In an enterprise setting, many versions of the same information are stored for record keeping. Storing data files like these without modification wastes storage space and data deduplication is a way to reduce data redundancy in a storage system.

In a deduplication system, unique pieces of data, or byte patterns, in a file are identified as "chunks," and they are stored during a process of analysis of the file. The analysis goes through the file, and other chunks are compared to the stored copy and whenever a match occurs, the redundant chunk is replaced with a small reference that points to the stored chunk. Because the same byte patterns may occur many times in a file, the amount of data that must be stored is greatly reduced.

Several factors affect deduplication efficiency. The amount of reduction of storage depends heavily on the distribution of the duplication within a file. The size of chunks also affects the reduction. A smaller chunk size saves more storage as it enables the system to identifying more duplicates. However, a smaller chunk size increases the size of meta-data, deduplication time, and fragmentation. Thus, the chunk size selection is a trade-off decision to a deduplication system. Another factor affecting the deduplication efficiency is how a file is divided up for deduplication. Ideally a file should be divided up in a way to maximize the possibility of finding duplicates. In a deduplication system, a file is divided up into data blocks, which are the units of deduplication.

Several techniques of anchoring data blocks of a file are known. One is fixed-block anchoring, where a data file is divided to consecutive blocks that are of a fixed size. The advantage of fixed-block anchoring is the simplicity of implementation as the deduplication technique requires little knowledge about any particular file. The limitation is that duplicates can be missed when the same pattern of byes are shifted. For example, if a slide is added to an existing presentation file, all the subsequent blocks in the file will be rewritten and are likely be considered as different from those in the original file thus deduplication with fixed-block anchoring will not pick up the duplicates.

Another anchoring technique is variable-size anchoring, where a storage system analyzes the interior data pattern of a file to determine anchoring points based on those interior data patterns. Variable-size anchoring requires more processing by the storage system but it may achieve better deduplication than fixed-block anchoring.

Files have various characteristics. One type of file is structured with a stream of data blocks, and each data block contains a meta-data portion and a data portion. This type of files is used widely, including databases and other structured datasets. The meta-data portions are prone to change more frequently than the data portions, and since they co-exist in a block, deduplication yields less saving in a storage system while still adds on database size, consumes deduplication time and increases file fragmentation. Variable-size anchoring is better at identifying duplicate byte pattern. However, variable-size anchoring ignores the block boundaries within this type of data. Since it searches for byte patterns overlapping meta-data portions and data portions, even though the former change more (thus less potential for deduplication) than the latter (thus have more potential for deduplication), its deduplication efficiency has room for improvement. A better way is needed to deduplicate files like these.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
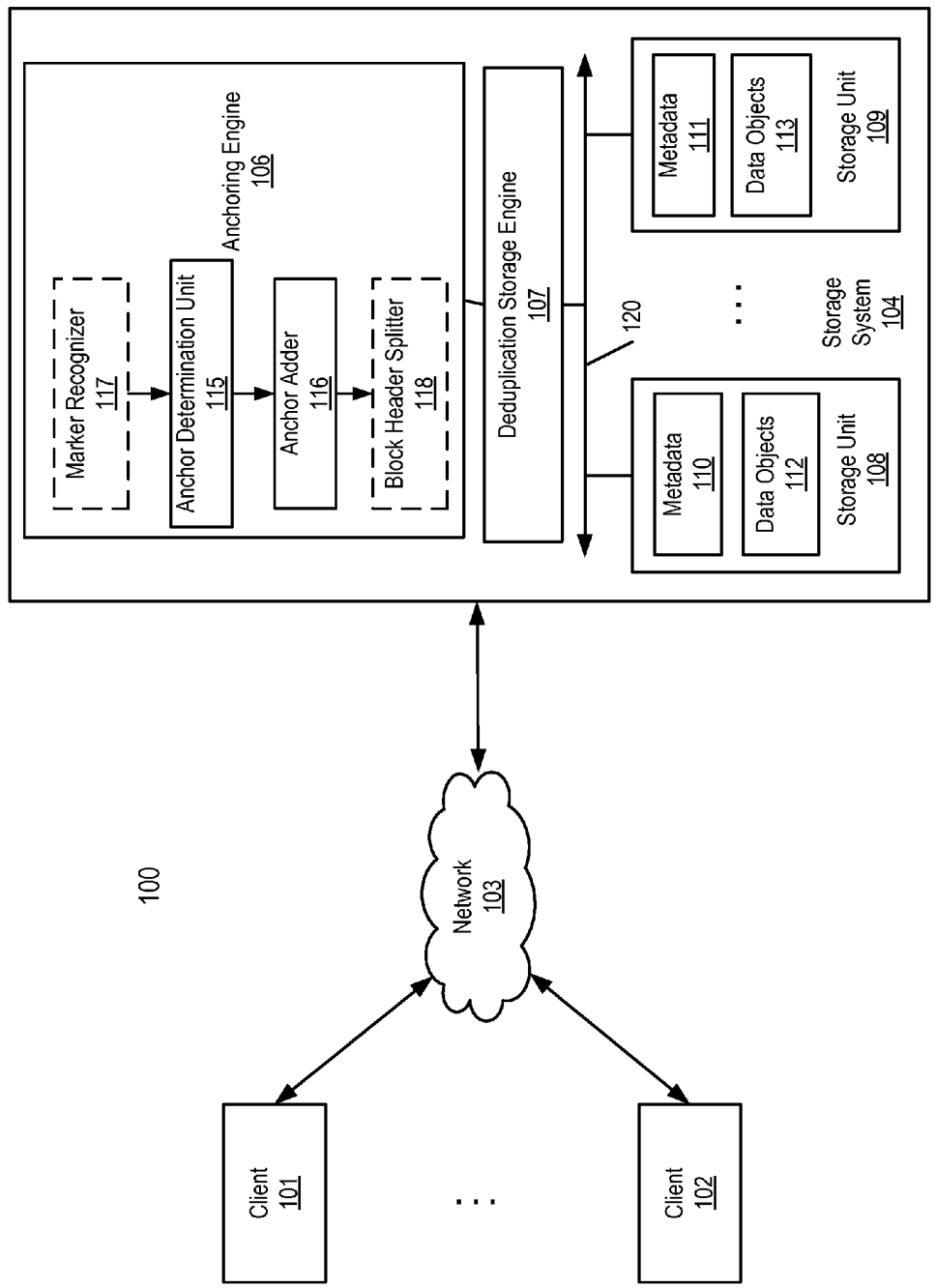
FIG. 1 is a block diagram illustrating a storage system.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

When a file such as a database file is received at a storage system such as a deduplicated storage system, the file is viewed as a stream of data blocks, with each data block having a header and a data portion. A header contains meta-data including design and specification of data structures used in the data block. A data portion contains only data content. A data block may be referred to as a data object, and the two terms are used interchangeably in this specification. A data block may be segmented into plurality of data chunks for deduplication purpose. A division of a portion of data created for duplication is referred as a chunk in this specification. A system may create chunks by determining anchor points within the file and denoting chunks as the data between anchor points. An anchor may be an offset within the data block demarking the beginning point for deduplication.

In one embodiment, a storage system may check for markers first, e.g., signature marked by a third party, embedded in the data content of a file. Markers are inserted in a structured data file in data operations prior to the file received at the storage system, e.g., for backup purpose. For example, a marker may be inserted in a file to mark the end of certain data type (boundary marker). The system may recognize these markers and remove these markers out of the block data. Meta-data, such as block headers, may also be considered as a marker, i.e., third party content related to the data. Then system may anchor the file at the location of the removed markers, and thus form chunks for deduplication. These markers may be stored separately without going through deduplication.

According to some embodiments, the storage system marks the data blocks for deduplication with first anchors based on their headers and at the boundaries between the headers and data portions. Then the system scans data portions of the data blocks. If certain characteristics satisfy a predetermined condition (e.g., the size of a data portion is bigger than a predetermined threshold), one or more anchors may be denoted in the data portions, in addition to the first anchors. In one embodiment, the predetermined threshold is a maximum chunk size defined by the storage system. In another embodiment, the predetermined threshold is an average chunk size defined by the storage system. The system marks more anchors in the data portions until the sizes of subsections of the data portion of the data block are less than the predetermined threshold. The anchoring process goes through the stream of data blocks.

Anchoring starts with the first block boundary. Then it switches anchoring to either fixed block anchoring or variable-sized anchoring until the next bock boundary is found. Thus the deduplication aligns with the block boundaries of a file's data block first, and then switch to anchoring based on either fixed block anchoring or variable-sized anchoring, through considering the different characteristics of header and data content. This is referred to as hybrid chunking. The hybrid chunking, by considering the specific characteristics of structured datasets and utilizing various techniques to deduplicate data content, achieves a better deduplication efficiency than both fixed-block anchoring and various-block anchoring. After the file is divided into chunks, the data chunks of the file go through the deduplication process.

In one embodiment, the system stores headers of data blocks separately from the data portions. The headers may or may not go through a deduplication process depend upon the characteristics of the headers. One approach is to divide the headers into deduplication segments and non-deduplication segments, and the two types of segments are stored separately and then the former going through deduplication, and the latter does not. The data portions, which may be sub-chunked, go through the deduplication process. Since headers of the data blocks are prone to change more frequently as compared to block data and even changing without change of block data, deduplicating those yields less saving in a storage space and still increases the database size, deduplication time, and fragmentation of the file. By deduplicating only the data portions and possibly sub-chunking the data portions, the system has a better deduplication efficiency.

FIG. 1 is a block diagram illustrating a storage system according to one embodiment of the invention. Referring to FIG. 1, system 100 includes, but is not limited to, one or more client systems 101-102 communicatively coupled to storage system 104 over network 103. Clients 101-102 may be any type of clients such as a server, a personal computer (e.g., desktops, laptops, and tablets), a "thin" client, a personal digital assistant (PDA), a Web enabled appliance, a gaming device, a media player, or a mobile phone (e.g., Smartphone), etc. Network 103 may be any type of networks such as a local area network (LAN), a wide area network (WAN) such as Internet, a corporate intranet, a metropolitan area network (MAN), a storage area network (SAN), a bus, or a combination thereof, wired and/or wireless.

Storage system 104 may include any type of server or cluster of servers. For example, storage system 104 may be a storage server used for any of various different purposes, such as to provide multiple users with access to shared data and/or to back up mission critical data. Storage system 104 may be, for example, a file server (e.g., an appliance used to provide network attached storage (NAS) capability), a block-based storage server (e.g., used to provide SAN capability), a unified storage device (e.g., one which combines NAS and SAN capabilities), a nearline storage device, a direct attached storage (DAS) device, a tape backup device, or essentially any other type of data storage device. Storage system 104 may have a distributed architecture, or all of its components may be integrated into a single unit. Storage system 104 may be implemented as part of an archive and/or backup system such as a deduplicating storage system available from EMC® Corporation of Hopkinton, Mass.

In one embodiment, storage system 104 includes, but is not limited to, anchoring engine 106, deduplication storage engine 107, and one or more storage units 108-109 communicatively coupled to each other. Storage units 108-109 may be implemented locally (e.g., single node operating environment) or remotely (e.g., multi-node operating environment) via interconnect 120, which may be a bus and/or a network. In one embodiment, one of the storage units 108-109 operates as an active storage to receive and store external or fresh user data, while the other storage unit operates as a target storage unit to periodically archive data from the active storage unit according to an archiving policy or scheme. Storage units 108-109 may be, for example, conventional magnetic disks, optical disks such as CD-ROM or DVD based storage, magnetic tape storage, magneto-optical (MO) storage media, solid state disks, flash memory based devices, or any other type of non-volatile storage devices suitable for storing large volumes of data. Storage units 108-109 may also be combinations of such devices. In the case of disk storage media, the storage units 108-109 may be organized into one or more volumes of Redundant Array of Inexpensive Disks (RAID).

In response to a data file to be stored in storage units 108-109, deduplication storage engine 107 is configured to deduplicate multiple chunks segmented by anchoring engine 106, according to a variety of segmentation policies or rules. Deduplication storage engine 107 may choose not to store a chunk in a storage unit if the chunk has been previously stored in the storage unit. In the event that deduplication storage engine 107 chooses not to store the chunk in the storage unit, it stores metadata enabling the reconstruction of the file using the previously stored chunk. As a result, chunks of data files are stored in a deduplicated manner, either within each of storage units 108-109 or across at least some of storage units 108-109. Data stored in the storage units may be stored in a compressed form (e.g., lossless compression: Huffman coding, Lempel-Ziv Welch coding; delta encoding: a reference to a chunk plus a difference; etc.). In one embodiment, different storage units may use different compression methods (e.g., main or active storage unit from other storage units, one storage unit from another storage unit, etc.).

The metadata, such as metadata 110-111, may be stored in at least some of storage units 108-109, such that files can be accessed independent of another storage unit. Metadata of each storage unit includes enough information to provide access to the files it contains. In one embodiment, metadata may include fingerprints contained within data blocks 112-113, where a data block may represent a data chunk, a compression region (CR) of data chunks, or a container of one or more CRs. Fingerprints are mapped to a particular data block via metadata 110-111, enabling the system to identify the location of the data block containing a chunk represented by a particular fingerprint. When an active storage unit fails, metadata contained in another storage unit may be utilized to recover the active storage unit. When one storage unit is unavailable (e.g., the storage unit has failed, or is being upgraded, etc.), the system remains up to provide access to any file not stored in the failed storage unit. When a file is deleted, the metadata associated with the files in the system is updated to reflect that the file has been deleted.

In one embodiment, the metadata information includes a file name, a storage unit where the chunks associated with the file name are stored, reconstruction information for the file using the chunks, and any other appropriate metadata information. In one embodiment, a copy of the metadata is stored on a storage unit for files stored on a storage unit so that files that are stored on the storage unit can be accessed using only the information stored on the storage unit. In one embodiment, a main set of metadata information can be reconstructed by using information of other storage units associated with the storage system in the event that the main metadata is lost, corrupted, damaged, etc. Metadata for a storage unit can be reconstructed using metadata information stored on a main storage unit or other storage unit (e.g., replica storage unit). Metadata information further includes index information (e.g., location information for chunks in storage units, identifying specific data blocks).

Referring back to FIG. 1, according to one embodiment, anchoring engine 106 includes an anchor determination unit 115, an anchor adder 116, an optional marker recognizer 117, and an optional block header splitter 118. Anchor determination unit 115 demarks chunk boundaries of a file with anchors based on original boundaries of the data blocks, which may be indicated by the headers of the data blocks. Anchor adder 116 demarks additional chunks within the data portion of the data blocks of a file according to a variety of chunking algorithms. Anchor adder 116 examines the characteristics of a data block to determine if it satisfies a predetermined condition. For example, the system may determine a size of data portion and compares the size to a predefined threshold, which may be represented by an average or a maximum chunk size of the deduplication system. If the size of a data portion is less than the threshold, the data portion is passed over to the next step without further action by anchor adder 116. If the size of a data portion is larger than the threshold, depending on the size of the data portion, the data portion may be subdivided into one or more additional chunks. For example, if the size of a data portion is 24 KB and the threshold is 8 KB, more than one anchor may be denoted thus creating additional chunks. The starting of the data portion is marked by anchor determination unit 115 already, and anchor adder 116 needs to denote additional anchors at starting of the 8 KB and the 16 KB respectively.

In one embodiment, the anchoring engine processes the file through a marker recognizer 117 first as shown in FIG. 1. Markers are often inserted into structured datasets in the course of operation and they are embedded to a file prior to being received at a storage system such as storage system 104. Those markers may be inserted by a third party application. Marker recognizer 117 recognizes these markers, and it may prioritize these markers based on a set of rules and may honor some of them. To honor some of the markers, Marker recognizer 117 removes the marker data from the data portion of a data block and may anchor the data block at the location of the removed markers. Whether to anchor at the location of the removed markers may depend on the characteristics of the removed markers. For example, if a removed marker is a tape marker, marker recognizer 117 may remove the marker without additional anchoring the data block. Yet if the removed marker is an embedded block header, marker recognizer 117 may remove the marker and denote one anchoring point at the location of the removed marker. The removed marker data may be stored separately in a storage system.

In another embodiment, after anchors are added to a file, the file goes through a block header splitter 118. Block header splitter 118 stores headers and data portions of data blocks separately. The headers may or may not go through the deduplication process, and they may be directly stored in a storage device directly when they do not go through the deduplication process. The data portions are separated out and go through deduplication storage engine 107 with the anchors added from anchor determination unit 115, anchor adder 116, and optionally marker recognizer 117. Note that anchoring engine 106 may be implemented as part of deduplication storage engine 107. Anchor determination unit 115, anchor adder 116, marker recognizer 117, and block header splitter 118 may be implemented as a single unit. Also note that the components as shown in FIG. 1 may be implemented in software, hardware or a combination thereof.

Figure 2:
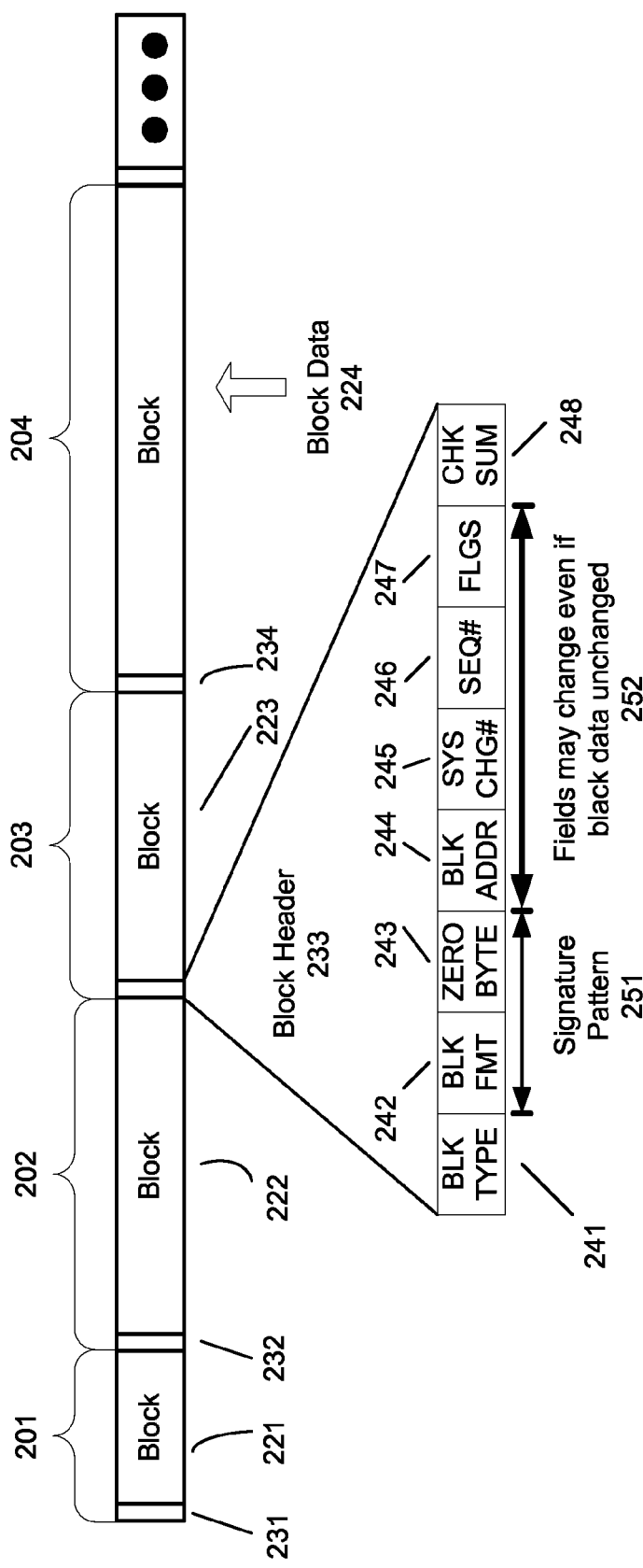
FIG. 2 is a block diagram illustrating an example of the make-up of a block header.

FIG. 2 is a block diagram illustrating a structure of a data stream according to one embodiment. A portion of the data stream is shown and the portion is represented by four data blocks, blocks 201-204, and each data block may represent a database object of a variety of databases. As shown, each data block contains a block header portion and a block data portion. The block headers are 231-234 and block data are 221-224 for blocks 201-204, respectively. An embodiment of a block header is shown as the zoomed-in version of block header 233. Block header 233 includes several parts. The first part 241 is block type BLK TYPE indicating type of the data block. The second part 242 is block format BLK FMT and the third part 243 is part zero byte ZERO BYTE, together 242 and 243 are a signature pattern 251 that a system may use to identify the boundary of a block. The next parts are block address BLK ADDR 244, system change number SYS CHG#245, system sequence number SEQ#246, and flag field FLGS 247 respectively, together 244-247 are fields that may change even if block data are unchanged and they are collectively marked as 252 in the figure. The last part 248 is checksum CHK SUM that ensures the integrity of the data block. Please note that the illustrated block header is one example and other embodiment for signature pattern 251 and field 252 are possible and these fields may not be implemented in the same order as illustrated. Block data portion is shown as block data 224, which contains various data content. As discussed earlier, block header 231-234 changes more frequently than block data 221-224, thus deduplication of block data portions 221-224 may be more efficient than that of block headers like block header 221-224. In addition, if deduplication is performed on the original data blocks 201-204, since the headers of data blocks 201-204 change often, such data blocks 201-204 may be considered different during deduplication process, even though data portions 221-224 are the same, thus deduplication efficiency may suffer.

Figure 3:
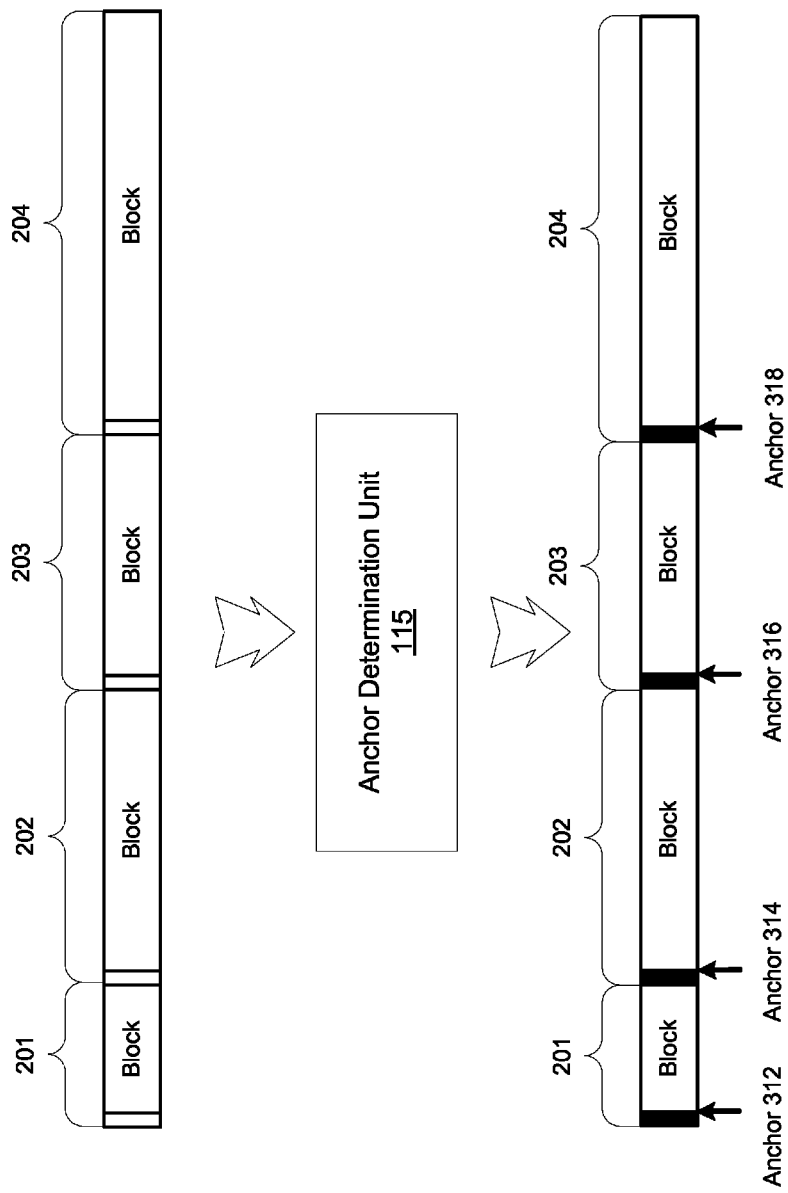
FIG. 3 is a block diagram illustrating a method to mark anchors for a file according to one embodiment of the invention.

FIG. 3 is a block diagram illustrating a process to mark anchors on a file according to one embodiment. As an example, the same portion of the file in FIG. 2 is shown here. The portion is received at a storage system with four data blocks, blocks 201-204. Once the data blocks are processed by anchor determination unit 115, the beginning of the data portion is determined by anchoring. The anchoring may be achieved using a signature pattern like signature pattern 251 as shown in FIG. 2. Once the signature pattern is recognized, the beginning of the data portion may be determined using an offset from the signature pattern. Thus blocks 201-204 are marked with anchor 312, anchor 314, anchor 316, and anchor 318, respectively. The anchors may be based on the boundaries of block data portions only, without considering the size of the block data portion. Thus, one data block may be marked with one anchor after being processed through anchor determination unit 115.

Figure 4:
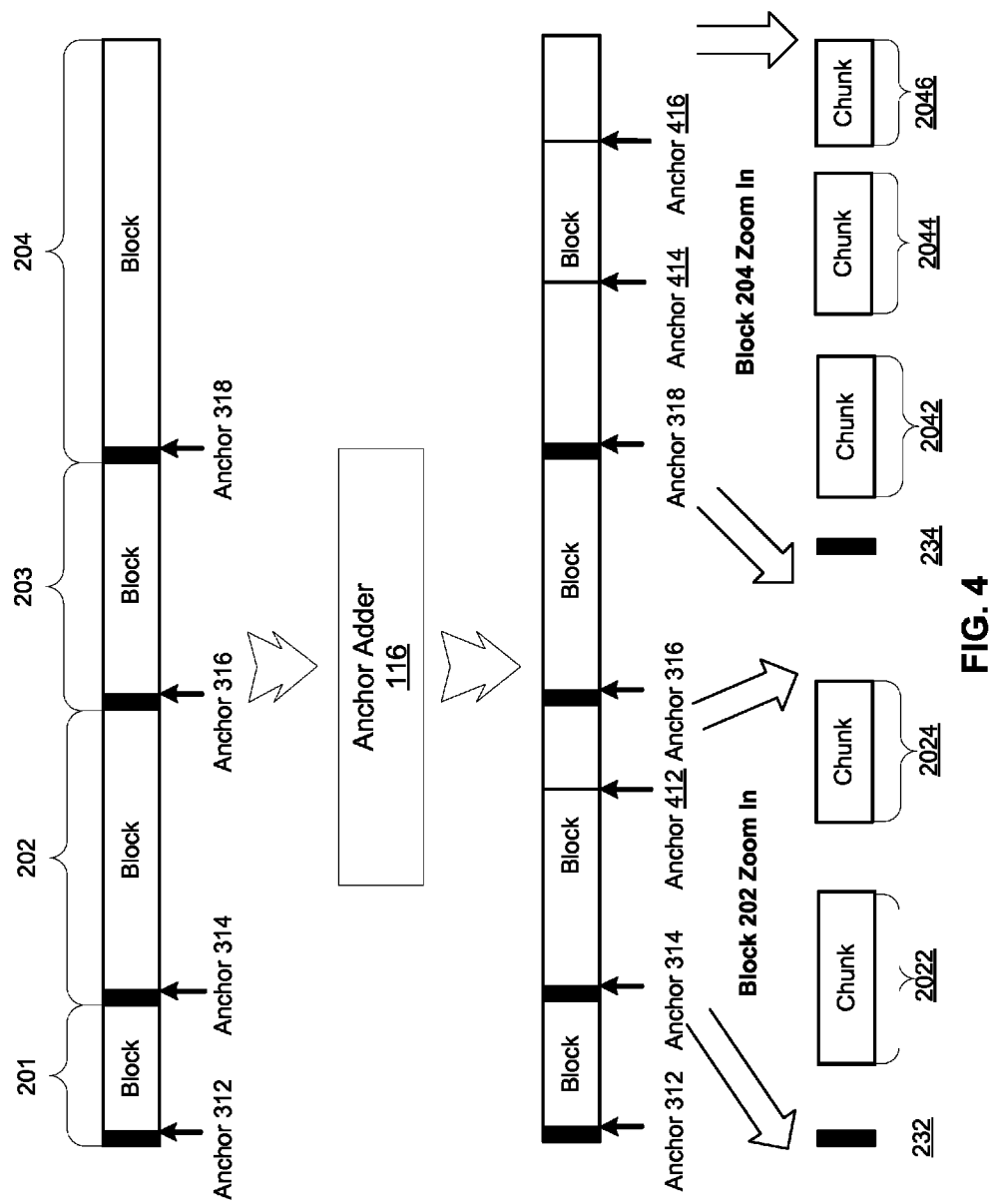
FIG. 4 is a block diagram illustrating a method to add anchors within data portions of a file according to one embodiment of the invention.

FIG. 4 is a block diagram illustrating a process to add anchor or anchors within a block data portion of a data block according to one embodiment. Anchor adder 116 scans a block data portion of a data block and determines if an additional anchor is required within the data portion. In one embodiment, anchor adder 116 examines a size of a block data portion to determine if the size exceeds a predetermined threshold. If the size of a data portion is smaller than the predetermined threshold, the data portion remains unchanged. As show in FIG. 3, in this example, it is assumed that the sizes of data portions of block 201 and block 203 are smaller than the predetermined threshold. Thus, these two blocks are unchanged going through anchor adder 116 and the block data portions of blocks 201 and 203 will be the chunks for deduplication if the block data portions are not being further denoted with anchoring points. Anchor 312 and anchor 314 remain the only anchors of block 201 and block 203 respectively after anchor adder 116 finishes processing the file. If the size of the data portion of a block exceeds the predetermined threshold, anchor adder 116 determines one or more additional anchor points in the data portion as needed. In some embodiments, the predetermined threshold may represent the maximum or the average chunk size defined by the deduplication system. Anchor adder 116 adds anchors to mark a data portion into smaller chunks so that the size of each chunk is smaller than the predetermined threshold defined by the system. In FIG. 4, it is assumed that the sizes of block 202 and block 204 exceed the predetermined threshold thus more anchors are needed. The number of added anchors depends on the size of the data portion and the data pattern. Using a variety of chunking algorithms, in this example, anchor adder 116 determines that only one anchor is required. With the additional anchor, anchor 412, the data portion of block 201 is further divided into two chunks, chunk 2022 and chunk 2024. Thus, block 202 is now demarked into three parts, header 232 as shown in FIG. 2, chunk 2022, and chunk 2024. Similarly, anchor adder 116 determines that two anchors are required for the data portion of block 204. Thus anchor 414 and anchor 416 are added in the data portion of block 204. Block 204 is demarked into four parts: header 234 as shown in FIG. 2, chunk 2042, chunk 2044, and chunk 2046.

Note the embodiment shows that the sizes of data blocks being different in a file is for illustration only, a file may have data blocks with an identical size.

Figure 5:
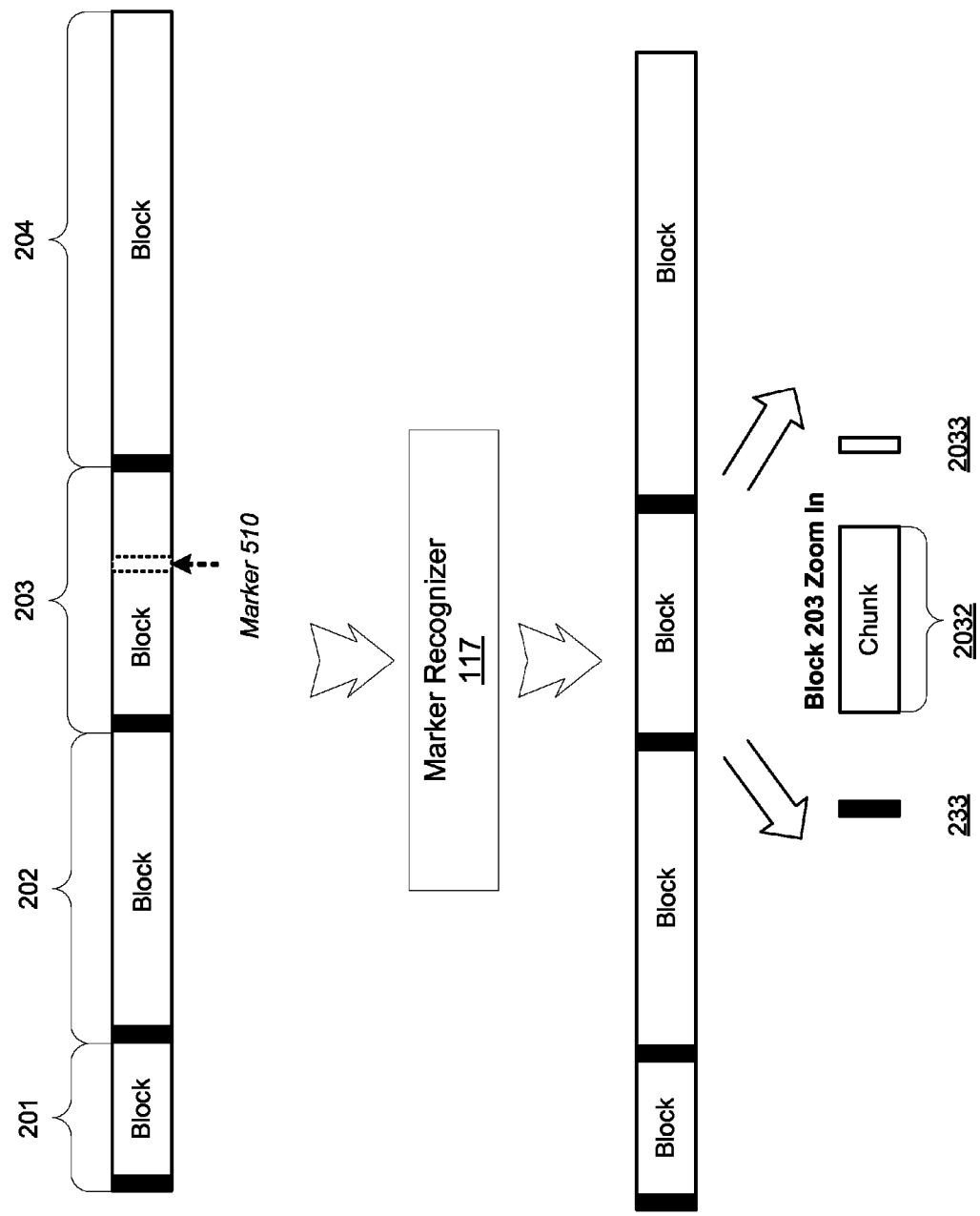
FIG. 5 is a block diagram illustrating a method to recognize anchors and markers within a file according to one embodiment of the invention.

FIG. 5 is a block diagram illustrating a process to recognize and select markers embedded within the data blocks according to one embodiment. A file, particularly a structured dataset file, often contains embedded markers within a file and these markers may be generated by a third party prior to being received at a storage system. Marker recognizer 117 processes such markers. As shown in FIG. 1, a file may be processed by market recognizer 117 first before the file is process by anchor determination unit 115 and anchor adder 116. The process within market recognizer 117 is illustrated in FIG. 6.

Figure 6:
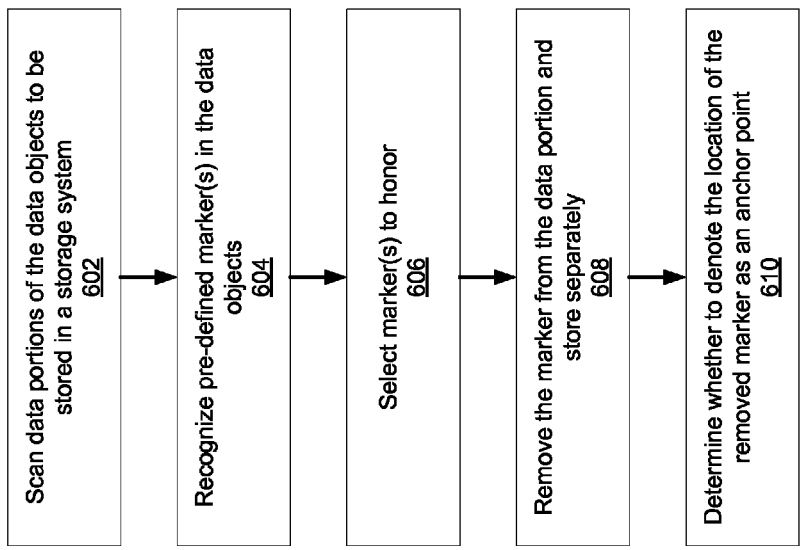
FIG. 6 is a flow diagram illustrating a method to recognize and select markers of a file according to one embodiment of the invention.

FIG. 6 is a flow diagram illustrating a method for processing markers according to one embodiment. A marker recognizer first scans a file at block 602. It identifies pre-defined marker or markers within headers and/or data portions of the data blocks first at block 604. Then the marker recognizer selects markers that it plans to honor at 606 according to a predetermined algorithm or rule. The selection may be based on the perceived deduplication efficiency. The marker recognizer then removes the recognized marker data from the scanned data block and stores them separately at block 608. Depending on the characteristics of the selected marker, a marker recognizer may or may not denote an anchoring point at the location of a removed marker at block 610. For example, if a selected marker is a tape marker, a marker recognizer may decide not to denote an anchoring point. On the other hand, if a selected marker is a block header marker, a marker recognizer may denote an anchoring point.

Referring back to FIG. 5, data block 203 contains an embedded marker 510. The marker 510 is not generated in the storage system 104, but it is created by operations prior to the file coming to the storage system 104, for example by a third party system. Marker recognizer 117 recognizes the marker 510. Marker recognizer 117 may or may not honor the marker 510 based on a set of rules. For example, a marker that appears more frequently in the data stream may be honored (e.g., higher priority) while another one that appears less frequently may not be honored (e.g., lower priority). Alternatively, a marker that occurs more than a predetermined number of times in the data stream may be honored. Here it is assumed that marker recognizer 117 decides to honor the marker and it is further assumed that marker 510 is a tape marker. Marker recognizer 117 removes the marker from the data block, and since the marker is not an embedded block header, marker recognizer 117 will not denote an anchor at the location of the removed marker. Thus block 203 is further demarked into header 233 as shown in FIG. 2, chunks 2032 formed by block data 223 as shown in FIG. 2 minus the removed tape marker, and tape marker 2033. Tape marker 2033 may be stored separately from chunks.

Figure 7:
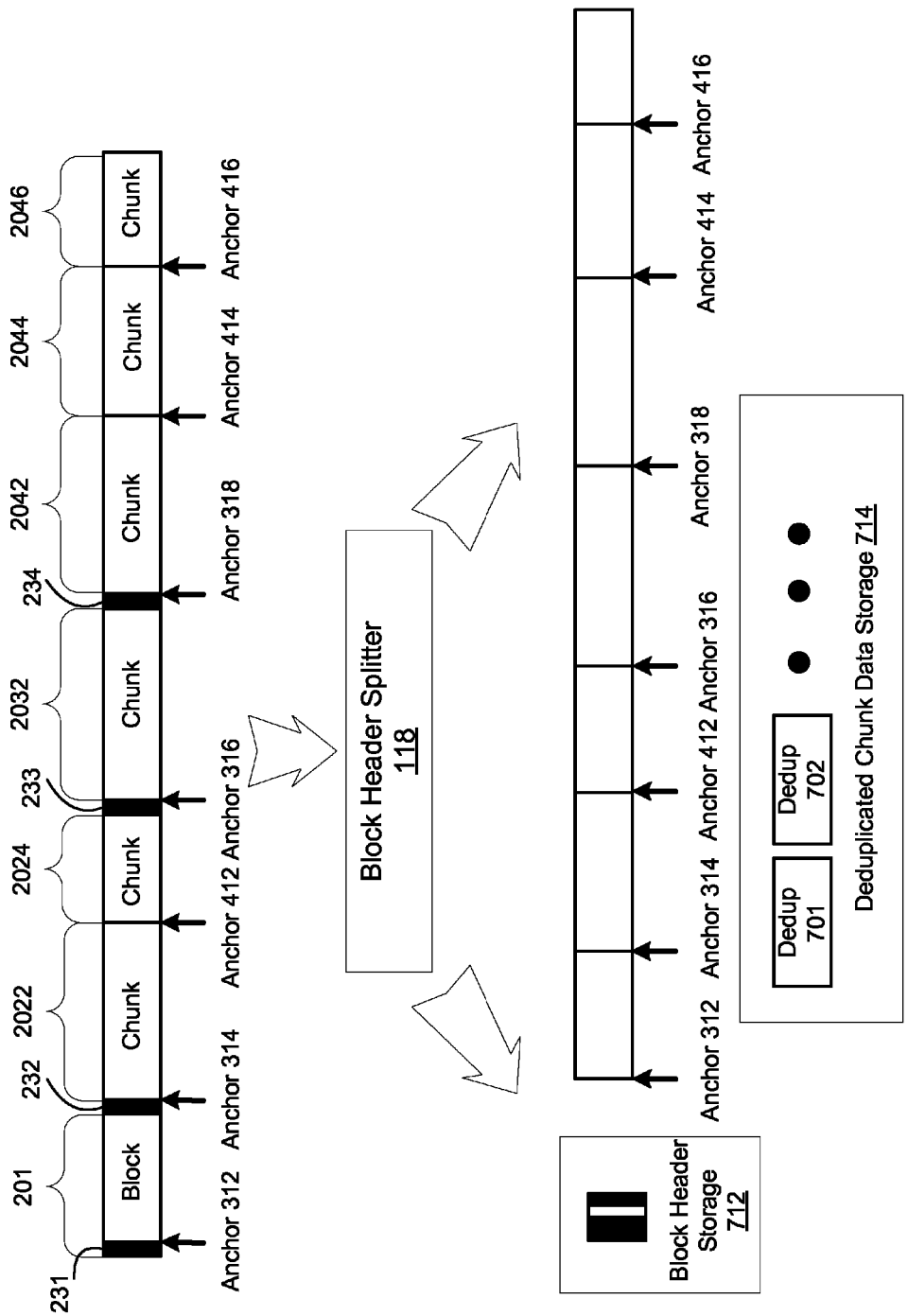
FIG. 7 is a block diagram illustrating a method to split block headers from data portions of a file according to one embodiment of the invention.

FIG. 7 is a block diagram illustrating a process to remove header for deduplication according to one embodiment. A data block may contain a header or metadata that changes more frequently than a data portion of the data block. If a system deduplicates headers of data blocks, it likely offers less saving in storage space and still increases the database size, deduplication time, and fragmentation of the file. One embodiment is to store headers separately from the data portions of a file. The header portion may or may not go through deduplication according to a set of rules. The data portions of the data blocks, on the other hand, are stored together and may be deduplicated by a deduplication storage engine. Here block headers are stored in block header storage 712. Block data (like the data portion of block 201 shown in FIG. 4) now are considered chunks for deduplication. These chunks and chunks formed by the anchoring process then go through deduplication. These chunks are deduplicated into one or more deduplicated data blocks and the deduplicated data blocks are then stored in a storage device of the storage system. As shown in FIG. 7, the chunks are deduplicated into deduplicated chunks Dedup 701, Dedup 702, and possibly more deduplicated chunks, and these deduplicated chunks are stored in deduplicated chunk data storage 714.

Figure 8:
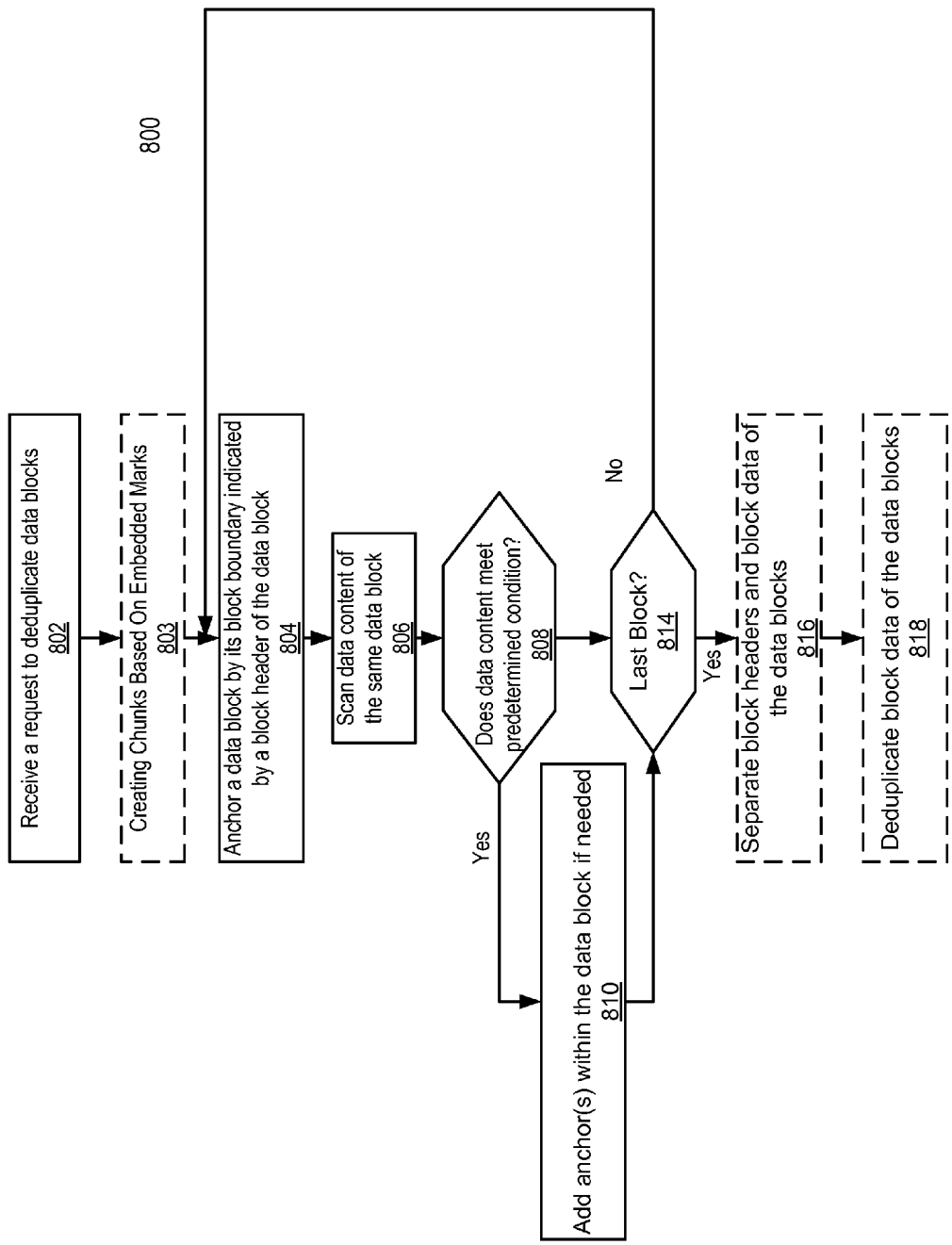
FIG. 8 is a flow diagram illustrating a method to deduplicate a file according to one embodiment of the invention.

FIG. 8 is a flow diagram illustrating a process of anchoring data blocks for deduplication according to one embodiment. The process starts with a system receives a request to deduplicate a file at block 802. 'The system may honor embedded third-party marks in the file at block 803. The system may divide a data block into smaller chunks at this step. Then, the system anchors a data block by its boundary at the starting of its data portion at block 804. The system then scans the data content of the data block at block 806. The system determines whether the data portion meets a predetermined condition at block 808. If the system finds the data portion meets the predetermined condition, it will demark additional anchor or anchors at block 810. Otherwise, the system moves on to check if the data block just examined is the last data block at block 814. The process iterates until the data blocks of a file being processed through the process. Then optionally the system separates resulting block headers from block data at block 816. Then optionally the block headers are stored separately with or without deduplication and the data portions of the data blocks are deduplicated at block 818.

The techniques discussed herein above may also apply in a client device of a network environment. Referring back to FIG. 1, for example, anchoring engine 106 can be implemented at client systems like client systems 101-102. Anchoring engine 106 may be implemented as a part of a client software running within a client. In one embodiment, a file to be streamed from client 101 (for the purpose of illustration) to storage system 104 for backup or replication purposes is processed through an anchoring engine at client system 101. It is assumed that the file includes data blocks containing headers and data portions. The headers can be separated and data portions of the file are anchored and segmented into chunks using the techniques discussed herein above. Metadata or fingerprints are then generated for the data chunks. In one embodiment, client system 101 does not need to send the entire file or all data chunks to storage system 104. Instead, it can send initially fingerprints of chunks to storage system 104 to determine whether those chunks have been already stored in storage system 104. By comparing a fingerprint received from client system 101 with those stored locally, storage system 104 can determine whether the corresponding data chunk has already been stored in storage system 104. As described above, when a deduplicated data chunk is stored in storage system 104, its fingerprint is separately stored therein. If storage system 104 has a copy of the received fingerprint stored therein, storage system 104 sends a response to client system 101 indicating that the corresponding chunk has been stored therein. As a result, no transmission of the corresponding chunk from client system 101 to storage system 104 is needed and network traffic can be significantly reduced. For headers, since they are not deduplicated, they are sent over without checking. In another embodiment, headers of a file are divided into deduplication segments and non-deduplication segments as discussed herein above, the deduplicated chunks of the deduplication segments of headers can be treated similarly as the deduplicated chunks of data portions of the file, and go through checking fingerprints first before being sent over.

Figure 9:
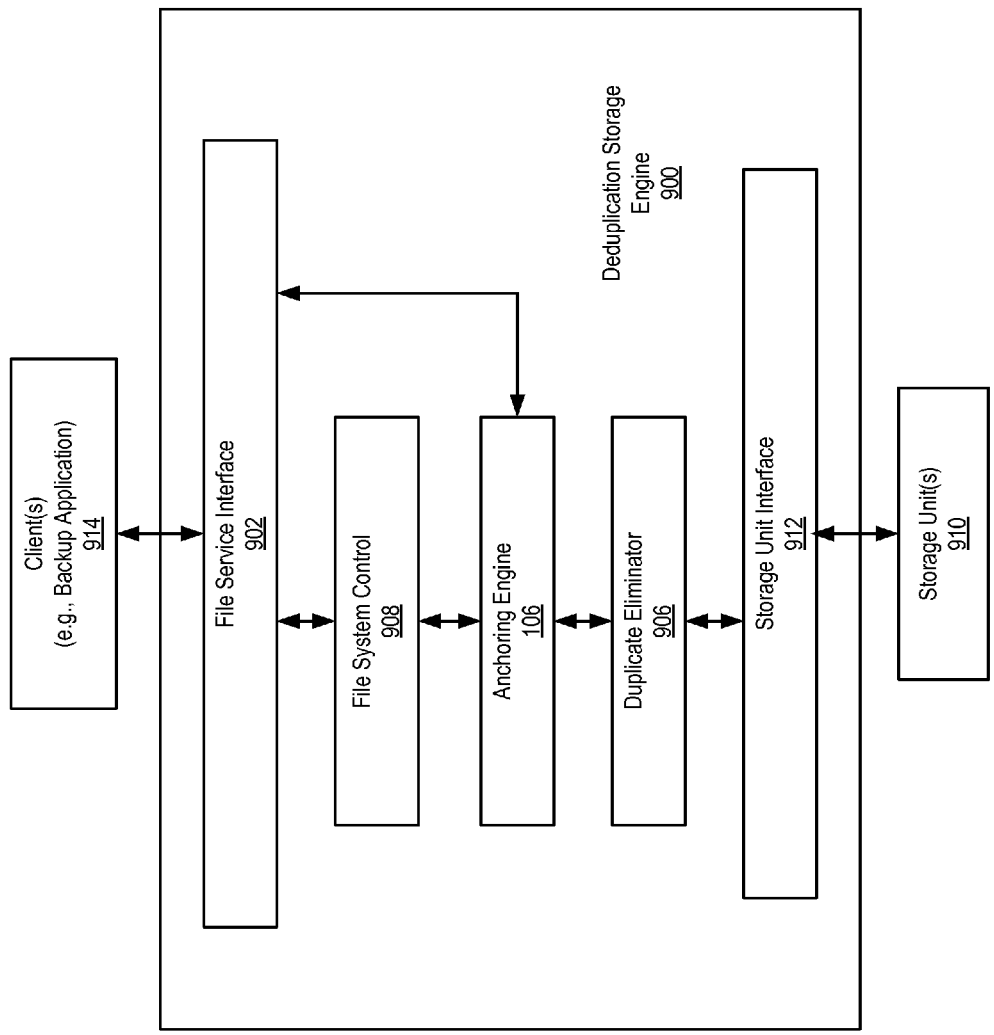
FIG. 9 is a block diagram illustrating a deduplicated storage system according to one embodiment of the invention.

FIG. 9 is a block diagram illustrating a deduplication engine according to one embodiment of the invention. For example, deduplication storage engine 900 may be implemented as part of a deduplication storage system as described above, such as deduplication storage engine 107 of FIG. 1. Referring to FIG. 9, in one embodiment, deduplication storage engine 900 includes file service interface 902, anchoring engine 106, duplicate eliminator 906, file system control 908, and storage unit interface 912. Deduplication storage engine 900 receives a file or files (or data item(s)) via file service interface 902, which may be part of a file system namespace of a file system associated with the deduplication storage engine 900. The file system namespace refers to the way files are identified and organized in the system. An example is to organize the files hierarchically into directories or folders. File service interface 912 supports a variety of protocols, including a network file system (NFS), a common Internet file system (CIFS), and a virtual tape library interface (VTL), etc. The file(s) is/are processed by anchoring engine 106 and file system control 908. Anchoring engine 106 breaks the file(s) into variable-length chunks based what we have discussed above using anchor determination unit 115, anchor adder 116, optional marker recognizer 117, and optional block header splitter 118.

In one embodiment, file system control 908 processes information to indicate the chunk(s) association with a file. In some embodiments, a list of fingerprints is used to indicate chunk(s) associated with a file. File system control 908 passes chunk association information (e.g., representative data such as a fingerprint) to an index (not shown). The index is used to locate stored chunks in storage units 910 via storage unit interface 912. Duplicate eliminator 906 identifies whether a newly received chunk has already been stored in storage units 910. In the event that a chunk has already been stored in storage unit(s), a reference to the previously stored chunk is stored, for example, in a chunk tree associated with the file, instead of storing the newly received chunk. A chunk tree of a file may include one or more nodes and each node represents or references one of the deduplicated chunks stored in storage units 910 that make up the file. Chunks are then packed by a container manager (not shown) into one or more storage containers stored in storage units 910. The deduplicated chunks may be further compressed using a variation of compression algorithms, such as a Lempel-Ziv algorithm before being stored.

When a file is to be retrieved, file service interface 902 is configured to communicate with file system control 908 to identify appropriate chunks stored in storage units 910 via storage unit interface 912. Storage unit interface 912 may be implemented as part of a container manager. File system control 908 communicates with an index (not shown) to locate appropriate chunks stored in storage units via storage unit interface 912. Appropriate chunks are retrieved from the associated containers via the container manager and are used to construct the requested file. The file is provided via interface 902 in response to the request. In one embodiment, file system control 908 utilizes a tree (e.g., a chunk tree) of content-based identifiers (e.g., fingerprints) to associate a file with data chunks and their locations in storage unit(s). In the event that a chunk associated with a given file or file changes, the content-based identifiers will change and the changes will ripple from the bottom to the top of the tree associated with the file efficiently since the appropriate content-based identifiers are easily identified using the tree structure.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method, comprising:
receiving a request at a system to deduplicate a file having a plurality of data blocks, each data block having a header and a data portion, wherein the file is received from a client application of a client device over a network to be stored in the system;
scanning to search a predetermined signature embedded within a header of each data block to identify a block boundary between the header and the data portion;
anchoring the data blocks using first anchors to indicate block boundaries based on the scanning of the predetermined signature, including
recognizing a plurality of markers within the data portions of the data blocks, wherein the markers were inserted into the data blocks by the client application prior to receiving the file over the network,
removing the recognized markers from the file, and
anchoring the data blocks using the first anchors at locations of the removed markers, wherein an anchor denotes a boundary between two data blocks;
adding at least one second anchor within a data portion of at least one data block that has been anchored by two of the first anchors, if the data portion of at least one data block satisfies a predetermined condition, wherein the second anchor is located between two first anchors;
separating data portions of the data blocks from the headers based on the first anchors;
chunking the data portion of the data blocks based on the first anchors and the at least one second anchor, generating a plurality of data chunks; and
deduplicating the data chunks of the data portions of the data blocks.

2. The method of claim 1, wherein the predetermined condition is satisfied when a size of a data portion of at least one data block exceeds a predetermined threshold.

3. The method of claim 2, wherein the predetermined threshold is one of an average chunk size and a maximum chunk size associated with the system.

4. The method of claim 1, wherein anchoring the data blocks at locations of the removed markers using the first anchors comprises:
recognizing a first marker and a second marker that indicate a boundary of a first data block;
determining whether the first marker and the second marker appear more than a predetermined number of times within the file; and
anchoring at a first location corresponding to the first marker and a second location corresponding to the second marker, in response to determining that the first marker and the second marker appear more than a predetermined number of times within the file.

5. The method of claim 1, further comprising:
storing the deduplicated data chunks at a first storage location; and
storing the headers separately from the deduplicated data chunks at a second storage location that is different from the first storage location.

6. The method of claim 1, wherein each of the data blocks represents a database object of a database system.

7. The method of claim 1, further comprising:
transmitting fingerprints of data chunks to a remote storage system to determine whether the data chunks have been stored therein, wherein the remote storage system is to compare the fingerprints and fingerprints stored locally within the remote storage system representing deduplicated data chunks stored therein; and
transmitting the data chunks only if the data chunks have not been stored at the remote storage system based on the comparison.

8. A non-transitory computer-readable storage medium having instructions stored therein, which when executed by a processor, cause the processor to perform operations, the operations comprising:
receiving a request at a system to deduplicate a file having a plurality of data blocks, each data block having a header and a data portion, wherein the file is received from a client application of a client device over a network to be stored in the system;

scanning to search a predetermined signature embedded within a header of each data block to identify a block boundary between the header and the data portion;

anchoring the data blocks using first anchors to indicate block boundaries based on the scanning of the predetermined signature, including recognizing a plurality of markers within the data portions of the data blocks, wherein the markers were inserted into the data blocks by the client application prior to receiving the file over the network, removing the recognized markers from the file, and anchoring the data blocks using the first anchors at locations of the removed markers, wherein an anchor denotes a boundary between two data blocks;

adding at least one second anchor within a data portion of at least one data block that has been anchored by two of the first anchors, if the data portion of at least one data block satisfies a predetermined condition, wherein the second anchor is located between two first anchors;

separating data portions of the data blocks from the headers based on the first anchors;

chunking the data portion of the data blocks based on the first anchors and the at least one second anchor, generating a plurality of data chunks; and deduplicating the data chunks of the data portions of the data blocks.

9. The non-transitory computer-readable storage medium of claim 8, wherein the predetermined condition is satisfied when a size of a data portion of at least one data block exceeds a predetermined threshold.

10. The non-transitory computer-readable storage medium of claim 8, wherein the predetermined threshold is one of an average chunk size and a maximum chunk size associated with the system.

11. The non-transitory computer-readable storage medium of claim 8, wherein anchoring the data blocks at locations of the removed markers using the first anchors comprises:

recognizing a first marker and a second marker that indicate a boundary of a first data block;

determining whether the first marker and the second marker appear more than a predetermined number of times within the file; and anchoring at a first location corresponding to the first marker and a second location corresponding to the second marker, in response to determining that the first marker and the second marker appear more than a predetermined number of times within the file.

12. The non-transitory computer-readable storage medium of claim 8, wherein the operations further comprise:

storing the deduplicated data chunks at a first storage location; and storing the headers separately from the deduplicated data chunks at a second storage location that is different from the first storage location.

13. The non-transitory computer-readable storage medium of claim 8, wherein each of the data blocks represents a database object of a database system.

14. The non-transitory computer-readable storage medium of claim 8, wherein the operations further comprise:

transmitting fingerprints of data chunks to a remote storage system to determine whether the data chunks have been stored therein, wherein the remote storage system is to compare the fingerprints and fingerprints stored locally within the remote storage system representing deduplicated data chunks stored therein; and transmitting the data chunks only if the data chunks have not been stored at the remote storage system based on the comparison.

15. A storage system, comprising:

a processor;

a memory;

an anchor determination unit loaded in the memory and executed by the processor to receive a request to deduplicate a file having a plurality of data blocks, each data block having a header and a data portion, the anchor determination unit to scan for searching a predetermined signature embedded within a header of each data block to identify a block boundary between the header and the data portion, and to anchor the data blocks using first anchors to indicate block boundaries based on the scanning of the predetermined signature, wherein the file is received from a client application of a client device over a network to be stored in the system, wherein anchoring the data blocks using first anchors comprises recognizing a plurality of markers within the data portions of the data blocks, wherein the markers were inserted into the data blocks by the client application prior to receiving the file over the network, removing the recognized markers from the file, and anchoring the data blocks using the first anchors at locations of the removed markers, wherein an anchor denotes a boundary between two data blocks;

an anchor adder executed by the processor to scan data portions of the data blocks and to add at least one second anchor within a data portion of at least one data block that has been anchored by two of the first anchors, if the data portion of at least one data block satisfies a predetermined condition, wherein the second anchor is located between two first anchors; and a duplication eliminator executed by the processor to separate data portions of the data blocks from the headers based on the first anchors, to chunk the data portion of the data blocks based on the first anchors and the at least one second anchor, generating a plurality of data chunks, and to deduplicate the data chunks of the data portions of the data blocks.

16. The system of claim 15, wherein the predetermined condition is satisfied when a size of a data portion of at least one data block exceeds a predetermined threshold.

17. The system of claim 15, wherein the predetermined threshold is one of an average chunk size and a maximum chunk size associated with the storage system.

18. The system of claim 15, wherein anchoring the data blocks at locations of the removed markers using the first anchors comprises:

recognizing a first marker and a second marker that indicate a boundary of a first data block;

determining whether the first marker and the second marker appear more than a predetermined number of times within the file; and anchoring at a first location corresponding to the first marker and a second location corresponding to the second marker, in response to determining that the first marker and the second marker appear more than a predetermined number of times within the file.

19. The system of claim 15, further comprising a block header splitter to store the deduplicated data chunks at a first storage location, and to store the headers separately at a second storage location that is different from the first storage location.

20. The system of claim 15, wherein each of the data blocks represents a database object of a database system.

21. The system of claim 15, wherein the storage system is a deduplicated storage system.

* * * * *